United States Patent
Rohm et al.

(10) Patent No.: US 10,217,154 B2
(45) Date of Patent: Feb. 26, 2019

(54) CLOTHING MEASUREMENT PREDICTION SYSTEM AND METHOD

(71) Applicant: Indochino Apparel Inc., Vancouver (CA)

(72) Inventors: Dennis Richard Rohm, Vancouver (CA); Luke Bornn, Cambridge, MA (US); Pavel Bakhilau, Vancouver (CA); Erik Walle, Vancouver (CA)

(73) Assignee: Indochino Apparel Inc., Vancouver (CA)

( * ) Notice: Subject to any disclaimer, the term of this patent is extended or adjusted under 35 U.S.C. 154(b) by 1083 days.

(21) Appl. No.: 14/167,666

(22) Filed: Jan. 29, 2014

(65) Prior Publication Data

US 2014/0214587 A1    Jul. 31, 2014

Related U.S. Application Data

(60) Provisional application No. 61/758,093, filed on Jan. 29, 2013.

(51) Int. Cl.
*G06Q 30/00* (2012.01)
*G06Q 30/06* (2012.01)

(52) U.S. Cl.
CPC ..... *G06Q 30/0621* (2013.01); *G06Q 30/0643* (2013.01)

(58) Field of Classification Search
CPC .................. G06Q 30/0621; G06Q 30/0643
See application file for complete search history.

(56) References Cited

U.S. PATENT DOCUMENTS

| | | | |
|---|---|---|---|
| 2002/0123821 A1* | 9/2002 | Ramsey | A41H 1/02 700/131 |
| 2006/0195219 A1* | 8/2006 | Luhnow | A41H 1/00 700/132 |
| 2011/0119040 A1* | 5/2011 | McLennan | G06F 17/18 703/2 |
| 2014/0176565 A1* | 6/2014 | Adeyoola | G06T 19/006 345/473 |

OTHER PUBLICATIONS

Vinué, G., León, T., Alemany, S., & Ayala, G. (2014). Looking for representative fit models for apparel sizing. Decision Support Systems, 57(0), 22-33. https://www.sciencedirect.com/science/article/pii/S0167923613001929 (Year: 2014).*

* cited by examiner

*Primary Examiner* — William J Allen
*Assistant Examiner* — Anand R Loharikar
(74) *Attorney, Agent, or Firm* — Brett J. Slaney; Blake, Cassels & Graydon LLP

(57) ABSTRACT

Disclosed in one embodiment is a method implemented in a computer system in which a customer reports physical characteristics, in which the customer is instructed how to perform measurements of the customer or in which a device measures the customer, in which the reported customer measurements are evaluated through use of a measurement model, in which a full set of measurements may not be required based on measurements already provided, and in which the reported customer measurements are evaluated for reliability. The method also scales the customer's measurements to a pattern, obtains the fulfilled pattern from vendors, and then fulfills the customer order.

28 Claims, 9 Drawing Sheets

CLOTHING MEASUREMENT PREDICTION SYSTEM AND METHOD

CROSS-REFERENCE TO RELATED APPLICATIONS

This application claims the benefit of priority to U.S. Provisional Patent Application No. 61/758,093; filed Jan. 29, 2013; titled Clothing Measurement Prediction System and Method; and naming inventors Dennis Richard Rohm et al. The above-cited application is hereby incorporated by reference, in its entirety, for all purposes.

FIELD

This disclosure is directed to software, and more particularly, to predicting clothing measurements for a person.

BACKGROUND

Custom tailored clothes can provide a better fit and finish than "off the shelf" pre-made clothes. However, obtaining a customer's measurements traditionally required visiting a tailor, in person, to be measured. This is a barrier to obtaining custom tailored clothes. Customers can be asked to provide their own measurements, but such measurements are prone to error and the measuring process may still take a long time.

When shopping online for "off the shelf" clothing, customers frequently order a range of sizes, anticipating that the items which do not fit will be returned. This creates costs for retailers and inconvenience for customers.

Computer systems have been developed to measure a person through use of a camera and sensor array, such as is found in the Kinect® product by Microsoft, Inc. However, such systems generally require the use of multiple sensor arrays arranged around the subject, require the subject to disrobe, require time for scanning and processing the scan data. Such systems may require hardware which is not commonly available to individuals, may require a private space, may cause psychological discomfort, embarrassment, create security issues with respect to digital images of the disrobed subject, and measurements from such a system should still be verified prior to use.

DETAILED DESCRIPTION

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list. Certain computer software routines executed by computers are described herein as "routines" or "subroutines." It should be understood that "routines" may be performed within other routines and that "subroutines" may be executed independent of another routine or subroutine; the two terms are used herein for the sake of convenience and should be understood to be equivalent.

The described embodiments of methods and systems which instruct a customer how to perform measurements, in which customer measurements are obtained and processed according to a measurement model, in which the user interface may be customized based on output of the measurement model, in which the output of the measurement model is used to determine the pattern for clothes, and in which clothes orders are fulfilled and tracked. The measurement model may comprise, for example, a probability distribution function or joint probability density function.

Figure 1:
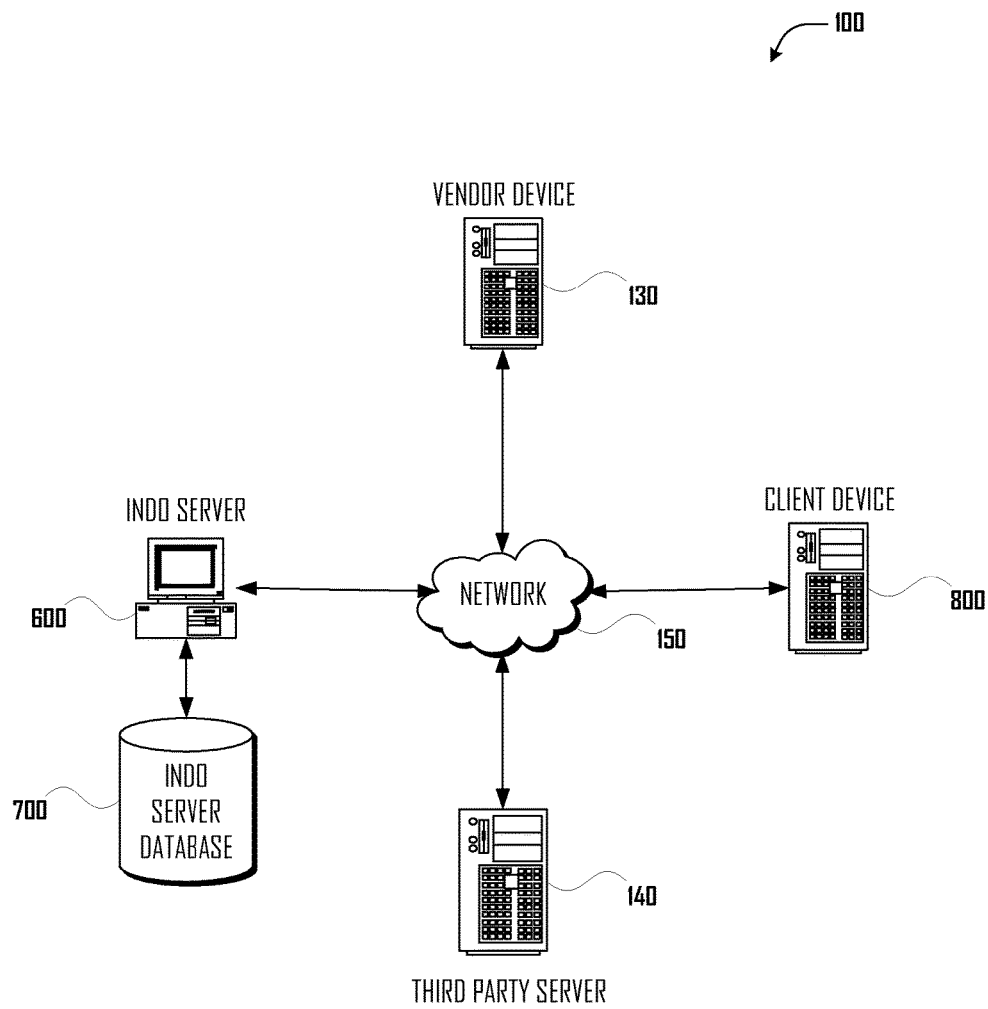
FIG. 1 is a network and device diagram illustrating exemplary computing devices in an environment configured according to embodiments disclosed in this paper.

FIG. 1 is a network and device diagram illustrating an exemplary computing environment 100 configured according to exemplary embodiments. Although illustrated as components integrated in one physical unit, the servers, computing devices and databases, such as Indo Server 600, Indo Server Database 700, Client Device 800, Vendor Device 130, and Third Party Server 140, may be provided by common (or separate) physical hardware and common (or separate) logic processors and memory components.

Also included in the computing environment 100 is Indo Server 600 connected to Network 150, such as the Internet, a private network, local area network (LAN), or the like. As discussed herein, Indo Server 600 interacts with Client Device 800 to establish measurements of a customer for use with respect to tailor made clothing and to receive orders for tailor made clothing. As discussed herein, Indo Server 600 places orders with Vendor Device 130 to obtain tailored clothing corresponding to the orders from Client Device 800 and interacts with Third Party Server 140 to fulfill the orders. Indo Server 600 is also connected to Indo Server Database 700. As used herein, "database" should be understood as a place where data is stored.

Also included in the computing environment 100 is Client Device 800, connected to a Network 150. As described herein, Client Device 800 interacts with Indo Server 600 to establish measurements of a customer for use with respect to tailor made clothing and to place orders for tailored clothing.

Network 150 comprises computers, network connections among the computers, and software routines to enable communication between the computers over the network connections.

Also illustrated in FIG. 1 is Third Party Server 140 connected to Network 150. Third Party Server 140 represents, for example, a service provider, such as a third party clothes distributor (who may utilize the processes described herein), a shipping service provider, a social network service provider, and other service providers. Third Party Server 140 may be implemented by a general purpose computer similar to Indo Server 600 or Client Device 800.

Also illustrated in FIG. 1 is Vendor Device 130 connected to Network 150. Vendor Device 130 represents, for example, a party who sells tailoring, clothes making, clothes accessory making services, or the like. Such services shall be referred to herein as "Clothes Services." Vendor Device 130 may be implemented by a general purpose computer similar to Indo Server 600 or Client Device 800. Vendor Device 130 may be provided by the same party operating Indo Server 600 or by a third party.

Figure 2:
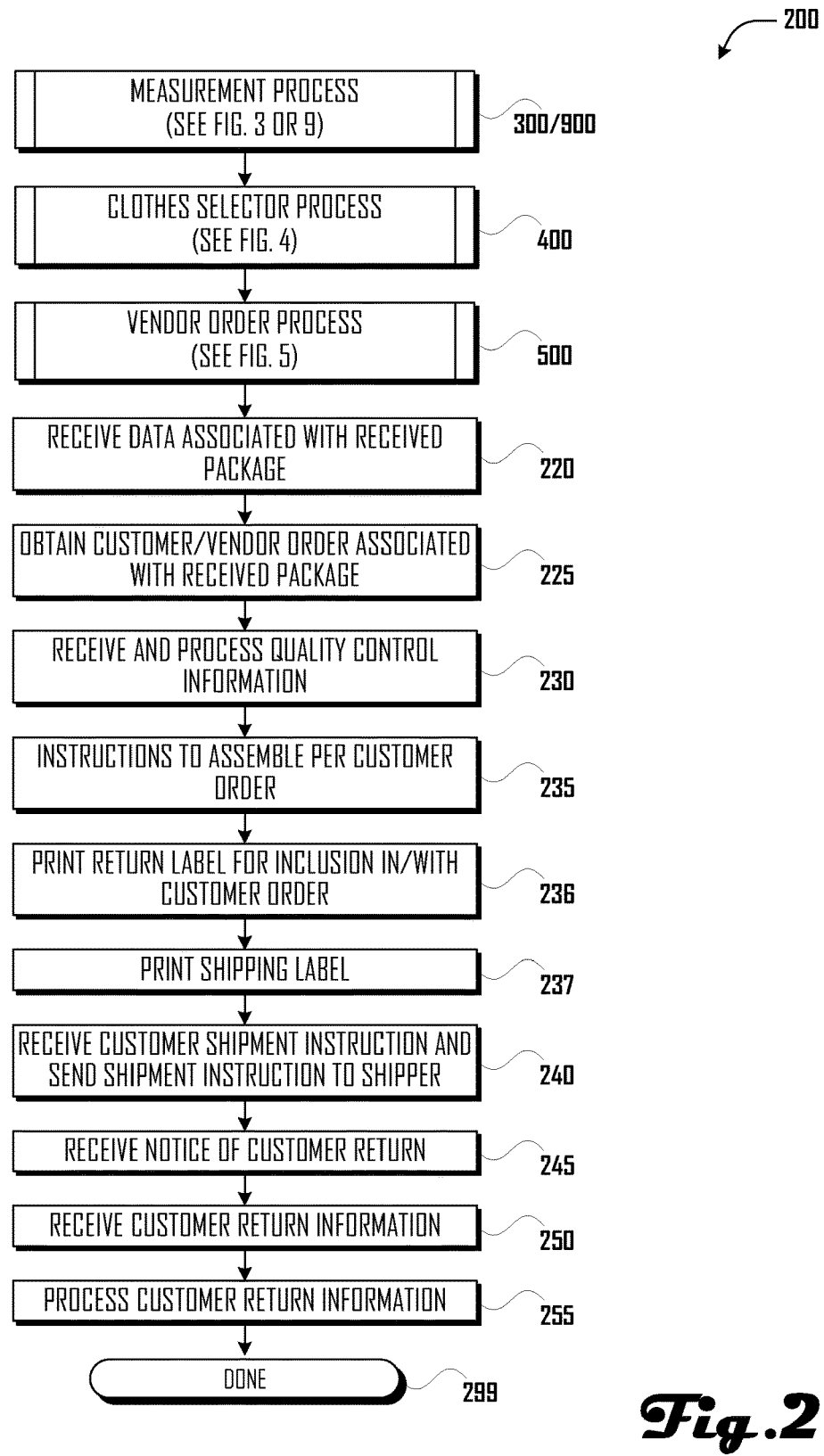
FIG. 2 illustrates a Measure, Select, Order, and Fulfill Routine.

FIG. 2 illustrates a Measure, Select, Order, and Fulfill Process 200, which may be executed by, for example, Indo Server 600, interacting with Indo Server Database 700, Client Device 800, Vendor Device 130, and Third Party Server 140.

At block 300/900, Measurement Process 300 or 900 launches or otherwise continues to execute to determine a set of Measurements 710 associated with a customer, such as a customer utilizing Client Device 800 (as used herein, "Customer" refers to such a party). Example embodiments of Measurement Processes are further illustrated as Measurement Process 300 in FIG. 3 and Measurement Process 900 in FIG. 9.

At block 400, Clothes Selector Process 400 launches or otherwise continues to execute to present Clothes Choices 720 to a Customer and to determine Customer Order 730 based on interaction with the Customer. An example embodiment of Clothes Selector Process 400 is further illustrated in FIG. 4. Clothes Selector Process 400 may be executed by, for example, Indo Server 600. While, as stated elsewhere, the blocks outlined in the flowcharts may be performed in an order other than as illustrated, blocks 300/900 and 400 may be performed in the reverse order (with 400 occurring before block 300/900).

At block 500, the Vendor Order Process 500 launches or otherwise continues to execute to divide up Customer Order 730 into components and order the components from (potentially different) Vendor(s) 130 as Vendor Order(s) 740. An example embodiment of the Vender Order Routine 500 is further illustrated in FIG. 5. Vender Order Routine 500 may be executed by, for example, Indo Server 600. As stated elsewhere, not all blocks outlined in the flowcharts may be performed; for example, in an embodiment, blocks 400 and 500 may be omitted.

At block 220, a tracking number, Tracking String 735, Customer Order 730 identifier, or Vendor Order 740 identifier are input into and received by Measure, Select, Order, and Fulfill Process 200. Tracking String 735 or other identifier may be input following receipt of a package, such as fulfilled Vendor Order 740, and data or records relating thereto are input into Measure, Select, Order, and Fulfill Process 200.

At block 225, Vendor Order 740 and/or Customer Order 730 associated with Tracking String 735 or other identifier (discussed further in relation to FIG. 5), may be retrieved.

At block 230, Measure, Select, Order, and Fulfill Process 200 may receive, process, and/or determine quality control information to facilitate review of the fulfilled Vendor Order 740 communicated to the Vendor Device 130 at block 500. The quality control information may comprise information relating to or associated with fulfillment of Vendor Order 740, such as information relating to a comparison of the items ordered in Vendor Order 740 and the items received, the condition of received items, the time it took for the items to be received relative to when the Vendor Order 740 was placed, whether the shipment was tracked, the party providing shipping services, the cost of the shipment, and the like, At block 235, instructions describing the components of Customer Order 730 which led to Vendor Order(s) 740 and describing assembly of the components into a fulfilled Customer Order 730 may be output along with handling instructions (such as gift wrapping, an alternative mailing address, the placement of a shirt inside of a vest inside of a jacket, and the like) to facilitate assembly of the components into one or more packages for shipment to Customer.

At block 236, a return label for inclusion in, on, or with the shipment to the Customer may be printed. The return label may comprise Tracking String 735, Customer Order 730 identifier, or Vendor Order 740 identifier.

At block 237, a shipping label may be printed, comprising data from Customer Record 705.

At block 240, an indication may be received indicating that Customer Order 730 has been assembled, packed, labeled, and that it is ready to be shipped to Customer. At this block, the weight and size of the package may be received and shipment services maybe ordered, such as by transmitting Customer address and the package information to a shipping company.

At block 245, notice of an expected Customer return may be received, by, for example, via Client Device 800 interaction with a website or call center, receipt of Tracking String 735, receipt of an indication from a shipper that a return label has been utilized, or the like.

At block 250, Tracking String 735 or similar may be input into Measure, Select, Order, and Fulfill Process 200, which Tracking String 735 or similar may be associated with the notice of a Customer return of block 245 or with Customer Order 730 and/or Vendor Order 740. Tracking String 735 may be from, for example, a received package.

At block 255, Measure, Select, Order, and Fulfill Process 200 may receive information in relation to returned Customer Order 730 (or component thereof), for example, to identify where the Measure, Select, Order, and Fulfill Process 200 may not have functioned to achieve a satisfactory outcome for the Customer. For example, information may be received indicating that the fit was not correct, which may prompt a message to the Customer asking the Customer to confirm the Measurements 710 and/or a Pattern 755 (including a scaled Pattern 755) determined from Measurements 710 according to Vendor Order Process 500 may be flagged for review.

Figure 3:
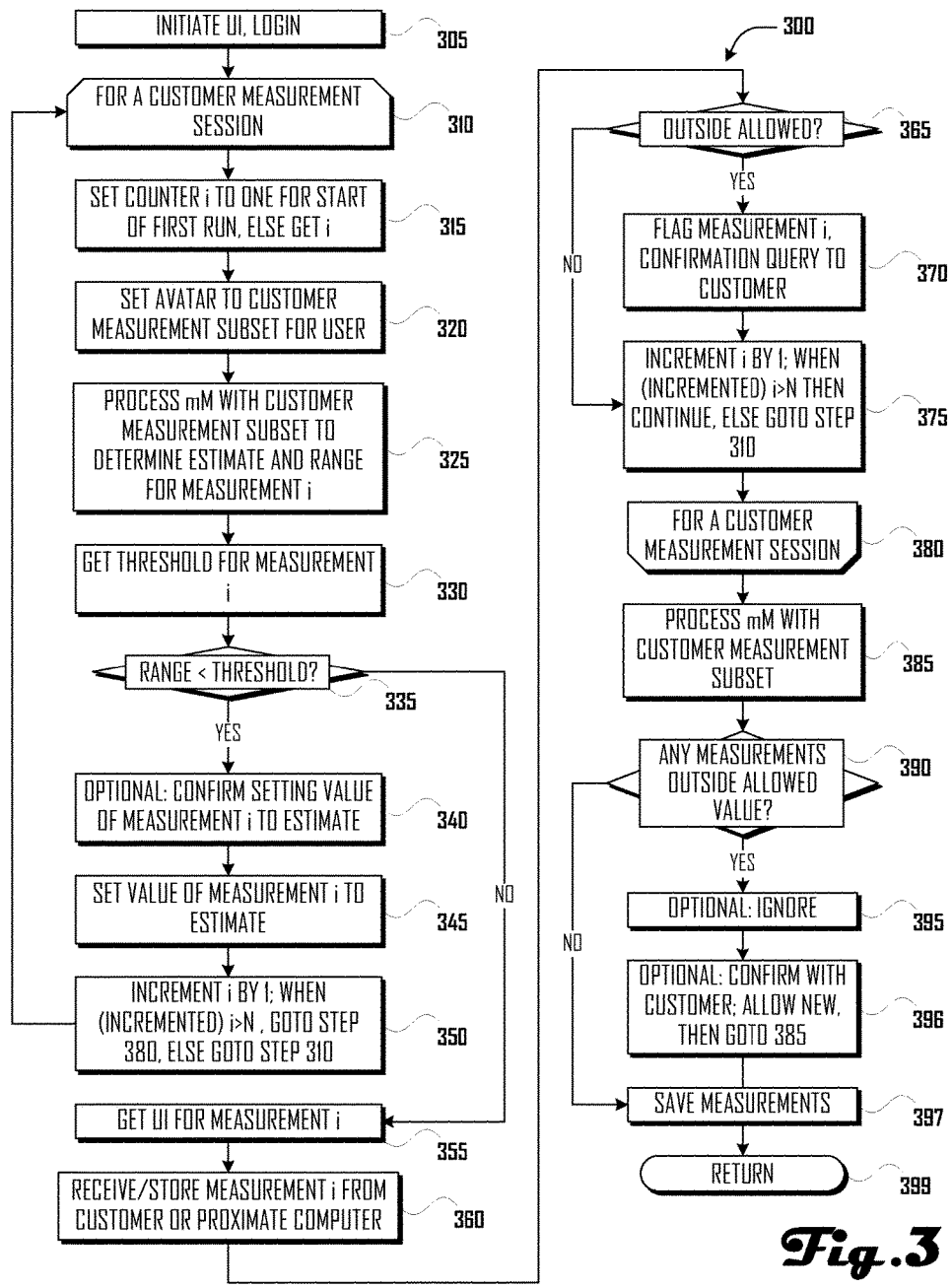
FIG. 3 illustrates an embodiment of a Measurement Process, in which Measurements are obtained from the Customer.

FIG. 3 illustrates an embodiment of Measurement Process 300, in which Measurements 710 are obtained for Customer from Client Device 800. An alternative embodiment of the Measurement Process is also presented in FIG. 9.

At block 305, a user interface ("UI") for obtaining Measurements 710 from Customer is initiated, such as by serving a webpage (or set of webpages) to Customer. The UI may comprise a login routine, which logs Customer into Measurement Process 300 and associates Customer with Customer Record 705.

The UI may contain components, such as an (optional) avatar which may be updated to approximate or illustrate Measurements 710 provided by Customer or which presents Measurement 710 choices to Customer as selectable options in the avatar, a set of questions which request that Customer provide Measurements 710, graphical figures (including illustrations, photographs, videos, and similar) and text which illustrate how to perform Measurements 710 or which illustrate Measurement 710 input to be provided by Customer (discussed further below in relation to block 355 and 360). The graphical figures may comprise input forms, boxes, and, for example, a "tape measure" to obtain Measurement(s) 710 and grading choices input by Customer. The "tape measure" may be a graphical representation of a tape measure or other graphical illustration of a measurement device divided into units, with the scale of the units presented in the illustration being selected according to the Measurement 710 in question (discussed further below in relation to block 355). The "tape measure" may be manipulated by Customer to input Measurements 710.

The UI may utilize camera(s) and sensor(s) (including those provided by a device such as a Kinect®) to obtain measurement data in relation to Customer, microphones to receive audio input from or acoustic information relating to the Customer, and a keyboard or the like to provide or obtain information to or from Customer to obtain Measurement(s) 710 and grading choices. The UI may perform speech recognition on audio input from Customer.

Blocks 310 to 380 may be iterated to obtain one or more Measurements 710 for Customer. Measurements 710 comprise Measurement 1 through N (where N is an integer; in the following example, N is 21), represented in the Figures as Measurement i, where i may be an integer between (and including) 1 through N, i acting as a counter of the number of Measurements 710 which have been obtained (or otherwise set) through that stage of the iteration of blocks 310 through 380.

Measurements 710 may comprise, for example, the following group which may be performed through input of a numeric value measuring a dimension of a body, such as via the "tape measure": shirt neck size, jacket/shirt length, chest size, stomach size, hips, shoulder size, sleeve length, bicep size, wrist size, pants length, waist size, crotch size, thigh size, and knee size.

Measurements 710 may comprise, for example, the following group which may be performed through input of a numeric value: height, weight, and age.

Measurements 710 may comprise, for example, the following group which may be performed through selection of an example within a range relative to a physical attribute: shoulder type (Customer input may select from examples of, for example, square, normal, or sloping shoulder types), chest type (Customer input may select from examples of, for example, muscular, regular, or husky/hefty), stomach type (Customer input may select from examples of, for example, flat, average, or rounded), and posture (Customer input may select from examples of, for example, flat, straight, and relaxed postures)). Measurements 710 may further comprise the sex of the Customer.

At block 315, the counter i is set to one for the start of the first run of iterations through the process, otherwise the value of i is obtained. Alternatively, a value may be utilized to determine the Measurements 710 which have been obtained, estimated, or ignored (hereinafter the "Customer Measurement Subset") and to proceed with a Measurement 710 which is not yet part of the Customer Measurement Subset.

At block 320, an avatar, "tape measure," or other graphical interface may be rendered to depict the Measurements 710 in the Customer Measurement Subset (the Measurements 710 which have been obtained, derived, or ignored). As discussed further below, because the Measurement Process 300 may utilize, for example, a Measurement Model "mM," and because, for example, the mM may utilize a distribution function, such as a probability distribution function, which probability distribution function may be an exponential family class of probability distribution functions, such as a normal probability density function and/or a joint probability density function, and because at the start of the iteration of blocks 310 through 380 the Customer has not yet provided Measurements 710, the first iteration of block 320 may set the graphical interface to depict the mean Measurement 710 value for each of the Measurements 710 across all Customers, as may be obtained, for example, from the mM Data 715. Alternatively, the "tape measure" or other graphical interface in the UI may be set to the mean Measurement 710 across all Customers for the first Measurement 710 which is to be obtained.

As blocks 310 through 380 iterate for each of the Measurements 710 i through N, the mM may be processed with each successive Measurement 710, resulting in actual Measurements 710 which are then (at that iteration) depicted in the avatar or in the "tape measure" along with the mean for the remaining Measurements 710 (null value Measurements 710, which have not yet been provided), though now the mean of such remaining (null value) Measurements may be determined utilizing the mM relative to the actual Measurements 710 provided by the Customer.

As discussed herein, the mM may utilize, for example, a probability distribution function, which probability distribution function may be an exponential family class of probability distribution functions, such as a normal probability density function and/or a joint probability density function, which uses statistical analysis to characterize the probability of Measurements i across a large corpus of Measurements 710.

An example of an mM is as follows:

$$f(X_1, X_2, \ldots, X_n) = 1/(2\pi)^{n/2}|\Sigma|^{1/2} * \exp(-\tfrac{1}{2}(X-\mu)^T \Sigma^{-1}(X-\mu))$$

Where each of $X_1, X_2, \ldots, X_n$ are the Measurements 710 for each of Measurements 1 through N, where $(X_1, X_2, \ldots, X_n)$ is the vector of all Measurement 710 values for each of Measurements 1 through N (where, in the example used herein, N is 21), and $\mu$ and $\Sigma$ are the model parameters mu and sigma. Values for the Measurements 710 may be transformed before being utilized in the mM function, such as by a logarithmic function (natural log or with another logarithmic base).

When supplied with null (or empty) values for any of Measurement(s) 710, the mM returns at least the mean of each of the Measurements 710; the mean of a Measurement 710 is also referred to herein as an "estimate" of the Measurement 710; when supplied with some actual values for Measurements 710 and null (or empty) values for the remaining Measurements 710, the mM returns the estimate of the remaining (null or empty) value Measurements 710, based on the actual values. Thus, for example, if the Customer provides a "height" Measurement value of 5'4", but has not yet supplied a value for a "pants length" Measurement 710, the mM will return an estimate for the "pants length" Measurement 710 based on other Customers who had a height of 5'4".

In addition to the values of Measurements 710, the mM may utilize the two model parameters, mu ($\mu$) and sigma ($\Sigma$). Generally speaking, mu is the mean, expectation, or estimated value for a particular Measurement 710 (which may be characterized as the peak of the distribution of values for the particular Measurement 710) while sigma is the standard deviation (generally, the square root of the variance; for example, four standard deviations—two on either side of the mean—may include 95.4% of all values in a normal probability density function).

The mM may also return the minimum and maximum expected values for the null values of the remaining Measurements 710, referred to herein as the "range," which range may include, for example, an acceptable number or users (as determined by the operator of the system and method), four standard deviations (two on either side of the mean), or 95% of all values for a particular Measurement 710, or another range of values. As discussed further herein, the range may be utilized to determine whether it is necessary to obtain an actual value of a Measurement 710 from the Customer. The estimate as well as the range may also (or alternatively) be utilized to set the centerline and range shown in the "tape measure" which the Customer may utilize to enter values for Measurements 710 in the UI.

Without limiting other statements in this paper which state that blocks may be omitted, blocks 325 through 350 may be omitted, proceeding from block 320 to block 355.

At block 325, the mM is processed with the values for the Customer Measurement Subset (Measurements supplied, estimated for, or ignored in relation to the Customer through the then-current stage of the iterative process of block 310 through 380) to determine the estimate and range for the remaining Measurements 710. Instead of processing all remaining Measurements 710, this block may only process the mM to determine the next Measurement 710 for which a Measurement 710 is then to be obtained from the Customer (Measurement i). As discussed above, processing the mM for the next (or all) remaining Measurements 710 will return at least the estimate and range for the next (or all) remaining Measurements 710, based on the Measurement 710 values which have actually been provided.

At block 330, the process may get Threshold 750 for the Measurement. Threshold 750 may be, for example, a confidence interval, an arbitrarily assigned value, a number of standard deviations, or another value.

At block 335, a determination may be made regarding whether the range from block 325 is less than Threshold 750 for the Measurement i obtained at block 330. If the range is less than Threshold 750, then it may not be necessary to require that the Customer to go through a process to determine Measurement i (extra precision will not or will not significantly change the result). Thus, at block 340, the Customer may optionally be requested to confirm setting the value of the Measurement i to the Estimate from block 325 and, at block 345, the value of the Measurement i may be set to the Estimate from block 325. At block 350, i is incremented by 1; when the incremented value of i is greater than N, then the process goes to block 380, otherwise the process returns to block 310.

At block 355 the UI for Measurement i is obtained, served to the Customer, and rendered, which UI may include graphical figures (including illustrations, photographs, videos, and similar) and text which illustrate how to perform the Measurement i or which illustrate how to interact with a computer measuring system to obtain the Measurement i. The UI may also include Customer input fields or tools, such as illustrations of the Measurement options which may be selected by the Customer (as in, for example, the case of the "shoulders" Measurement) and the "tape measure" which the Customer may use to provide numeric input, such as by dragging a ruler (which may be rendered to appear as though to be a moving tape measure) beneath or in proximity to a pointer. As noted above, the estimate as well as the range may also (or alternatively) be utilized to set the centerline and range shown in the "tape measure" which the Customer may utilize to enter values for Measurements 710 in the UI.

At block 360, the Customer or a proximate computer, such as a computer measuring system, inputs Measurement i, which input is stored.

Without limiting other statements in this paper which state that blocks may be omitted, blocks 365 and 370 may be omitted, with the process proceeding from block 360 to 375.

At block 365, a determination may be made regarding whether the value input at block 360 was outside an allowed boundary. The determination may be made, for example, by running mM on the corpus of all Measurements 710 across all customers (the output thereof may found in the mM Data 715 and need not be performed anew for each successive Customer) as well as the Customer Measurement Subset and determining, for example, if the input value of block 360 is outside of four standard deviations (two on either side of the mean), or, for example, is the Measurement 710 of block 360 in the top or bottom 2.5% of all values, or, for example, does the Measurement 710 of block 360 have a value above or below a set amount.

If the input value is determined to have been outside the allowed boundary, then at block 370 Measurement 710 of block 360 may be flagged and/or a query may be presented to Customer in the UI requesting that Customer confirm the input value. If flagged and/or if Customer confirms the input value, the flagged input value may be accepted or, alternatively, ignored, with, for example, the value being left null or with the Estimate determined at block 325 being supplied for the Measurement i.

At block 375, which may follow block 365 when the input value was not determined to be outside the allowed boundary, i is incremented by 1; when the incremented value of i is greater than N (when the last Measurement is obtained or determined) the process continues, otherwise the process returns to block 310, to continue until all Measurements 1 through N have been obtained.

At block 380, the process returns to block 310 to iterate for each of Customer Measurements 1 through N, until, as illustrated at block 375, the incremented value of i is greater than N, whereupon the process continues to block 385.

If not already performed, at block 385, the mM may be processed with the Customer Measurement Subset, which now includes all Customer Measurements 710 set at block 345, received at block 360, or confirmed or ignored at block 370.

At block 390, a determination may be made regarding whether any of Measurements 710 associated with Customer are outside of an allowed range of values. The determination may be made, for example, by determining if any of the Measurement 710 values are outside of four standard deviations (two on either side of the mean), or, for example, is the Measurement 710 in the top or bottom 2.5% of all values, or, for example, does a Measurement 710 have a value above or below a set amount. This block is similar to block 365, though now using a complete Customer Measurement Subset. At block 395, the outside-range value may be ignored, for example, by assigning a null value or by assigning the estimate determined at block 325, or, at block 396, the Customer may be asked to confirm the outside-range value or may be allowed to enter a new value, which may then send the process back to block 385.

At block 397, which may follow block 390 if it was determined that no Customer Measurements 710 were outside the allowed range, the Measurements 710 obtained, determined, or ignored in the Measurement Process 300 may be saved in association with, for example the Customer Record 705 associated with Customer.

Figure 4:
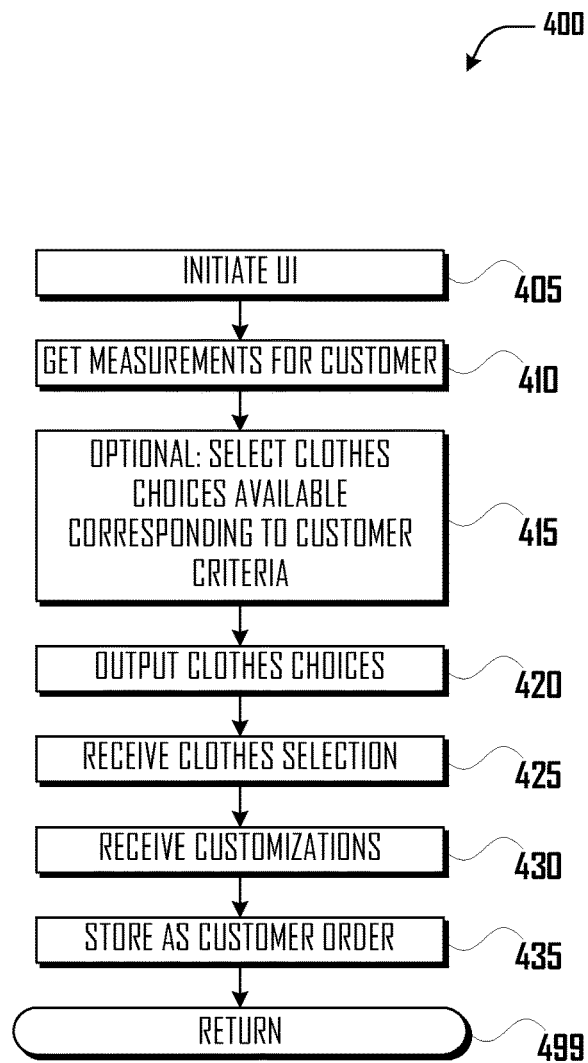
FIG. 4 illustrates an embodiment of a Clothes Selector Process, in which a Customer Order is determined.

At block 399, the process may return to FIG. 2 and block 400, an example embodiment of which is illustrated in FIG. 4.

FIG. 4 illustrates an embodiment of a Clothes Selector Process 400, in which Customer Order 730 is determined.

At block 405, the UI for selecting Clothes Choices 720 may be initiated. The UI may be a continuation of the UI discussed in relation to FIG. 3, though now with components to present Clothes Choices 720 to Customer and to receive selections from Customer as Customer Order(s) 730. The UI may comprise a login routine, to login the Customer and identify or create a Customer Record 705 associated with the Customer. Customer Record 705 may comprise, for example, contact information for the Customer, an identifier of the Customer, billing and login information for the Customer, and the like. Customer Record 705 may be associated with Measurement(s) 710, Customer Orders 730, and the like. Logging the Customer in maybe performed prior to collection of Measurements 710 and/or prior to confirmation of a Customer Order 730.

At block 410, Measurements 710 associated with Customer and Customer Record 705 may be obtained. Obtaining the Measurements 710 may be performed in a different order, such as after storing Customer Order at block 435, or, for example, block 410 may not be performed (such as if block 415 is not performed).

At block 415 (which may be omitted), Clothes Choices 720 may be filtered based on the Measurements 710 obtained at block 410, to obtain, for example, Clothes Choices 720 which are available according to various criteria, such as male/female, or available in certain sizes (such as based on the Measurements 710).

At block 420, Clothes Choices 720 may be output for Customer to review. The output may provide a series of webpages which allow Customer to select an article of clothing, a style of the article, materials to be used in the article, colors for the materials, customization options relating to the article (such as pleats, suspender buttons, lapel style), and the like. The output may provide illustrated examples. The output may be rendered on an avatar, such as the avatar of block 315.

At block 425, Customer inputs Clothes Choice 720, which is received by Clothes Selector Process 400.

At block 430, additional customizations (if any) may be received from Customer, such as monogramming, accessories (such as matching cuff links, tie, etc.), gift wrapping, special delivery instructions, or otherwise.

At block 435, Clothes Choice 720 and customizations may be stored as Customer Order 730. As part of block 435 or during another block, such as during login and account creation, Customer may provide payment information and authorization to charge for Customer Order 730. One or more steps of Clothes Selector Process 400 may be iterated to allow the Customer to include more than one item in one Customer Order 730. As noted above, logging in of Customer and obtaining Customer Record 705 and/or Measurements 710 associated with Customer's Customer Record 705 may be performed as part of block 435.

At block 499, the process returns to FIG. 2.

Figure 5:
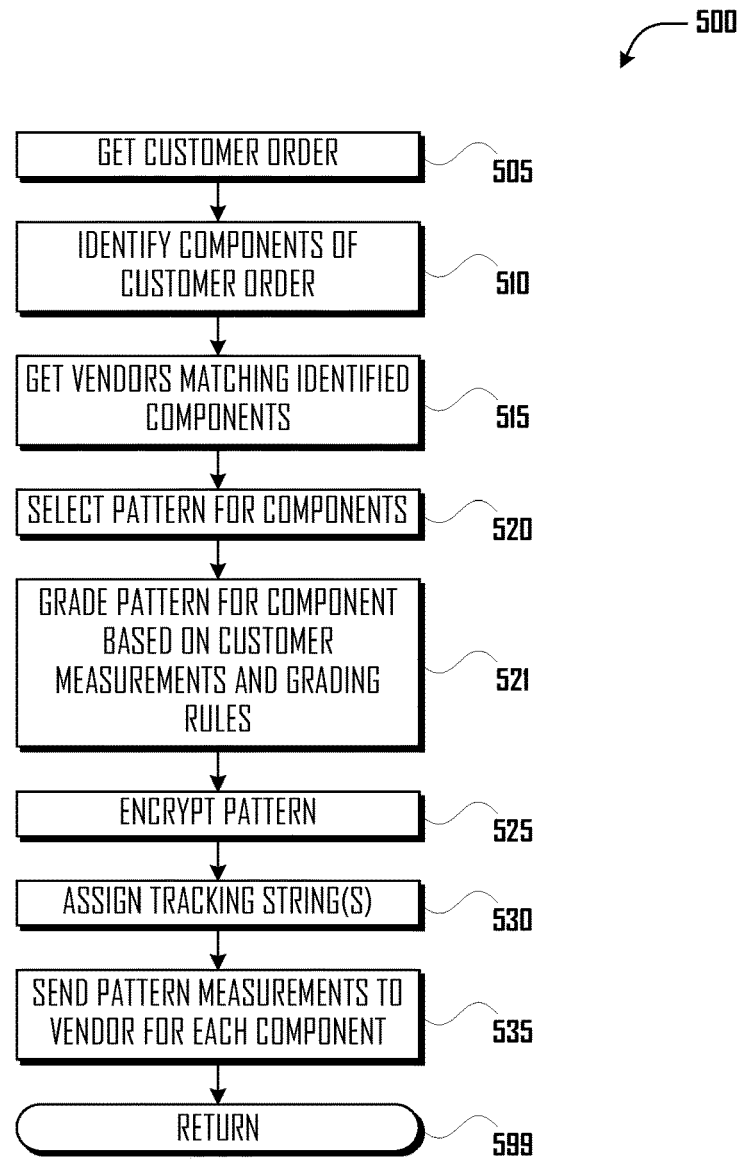
FIG. 5 illustrates an embodiment of a Vendor Order Process, in which a Vendor Order is determined.

FIG. 5 illustrates an embodiment of Vendor Order Process 500, in which a Vendor Order 740 is determined.

At block 505, Customer Order 730 may be obtained, if it is not already in memory. At block 510, the components of Customer Order 730 may be identified, such as according to components which may be fulfilled by different Vendors 130. For example, a first Vendor may provide the cloth, while a second Vendor may cut the cloth, while a third Vendor may provide sewing services, while a fourth Vendor may provide monogramming services or a requested accessory. As another example, a first Vendor may tailor pants while another tailors a shirt, both of which may be part of one Customer Order 730. At block 515, Vendor(s) 130 matching the identified components may be obtained.

At block 520, Pattern(s) 755 for component(s) within Clothes Choices 720 of Customer Order 730 may be obtained. At block 521, Measurements 710 associated with Customer are obtained and Pattern 755 may be graded. Grading may be according to records which describe how to scale or grade Measurements 710 to Patterns 755, such as according to Grading Rules 745 records. Grading the Pattern 755 may involve scaling a Pattern 755 in one or more dimensions according to Grading Rules 745 and Measurements 710. Grading may further involve input by a human and/or confirmation of grading by a human.

At block 525, the Pattern 755 from block 520 or 521 may be encrypted. Pattern 755, encrypted or not, may be utilized by a cloth cutting or sewing machine at a Vendor Device 130.

At block 535 a tracking string or strings, such as Tracking String 735, may be assigned to the one or more of the components of Customer Order 730. Tracking String(s) 735 may encode information regarding Customer Order 730, as well as regarding the components and/or Vendors 130 who are to be used to fulfill Customer Order 730. Tracking String(s) 735 may be associated with Customer Order(s) 730. At block 530, (optionally encrypted) Pattern 755 may be transmitted to Vendor(s) 130 associated with the components of Customer Order 730 as Vendor Order(s) 740. At block 599, the process may return to FIG. 2.

Figure 6:
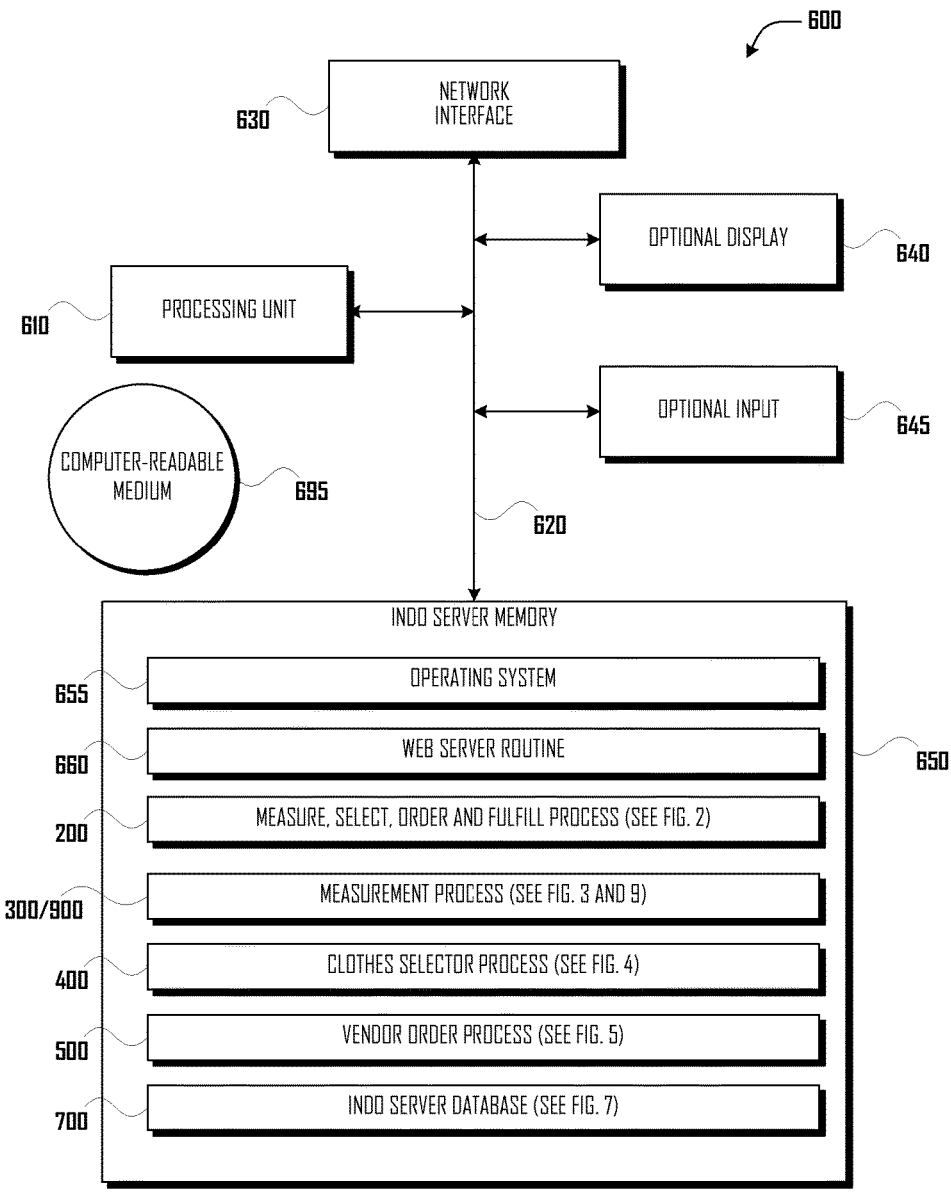
FIG. 6 is a functional block diagram of an exemplary Indo Server computing device and some data structures and/or components thereof.

FIG. 6 is a functional block diagram of an exemplary Indo Server 600 computing device and some data structures and/or components thereof. In some embodiments, Indo Server 600 may include many more components than those shown in FIG. 6. However, it is not necessary that all of these generally conventional components be shown in order to disclose an illustrative embodiment. As shown in FIG. 6, Indo Server 600 includes network interface 630 for connecting to Network 150.

Indo Server 600 also includes at least one processing unit 610, memory 650, and an optional display 640, all interconnected along with the network interface 630 via a bus 620. Memory 650 generally comprises a random access memory ("RAM"), a read only memory ("ROM"), and a permanent mass storage device, such as a disk drive or SDRAM (synchronous dynamic random-access memory). Memory 650 stores program code for software routines, such as, for example, web server routine 660, Measurement Process 300 or 900, Clothes Selector Process 400, Vendor Order Process 500, as well as browser, email servers, client applications, and database applications. In addition, memory 650 also stores an operating system 655. These software components may be loaded from a non-transient computer readable storage medium 695 into memory 650 of Indo Server 600 using a drive mechanism (not shown) associated with a non-transient computer readable storage medium 695, such as a floppy disc, tape, DVD/CD-ROM drive, memory card, or other like storage medium. In some embodiments, software components may also or instead be loaded via a mechanism other than a drive mechanism and computer readable storage medium 695 (e.g., via network interface 630).

Indo Server 600 may also comprise hardware supporting optional input modalities, Optional Input 645, such as, for example, a touchscreen, a keyboard, a mouse, a trackball, a stylus, a microphone, and a video and/or still camera.

Figure 7:
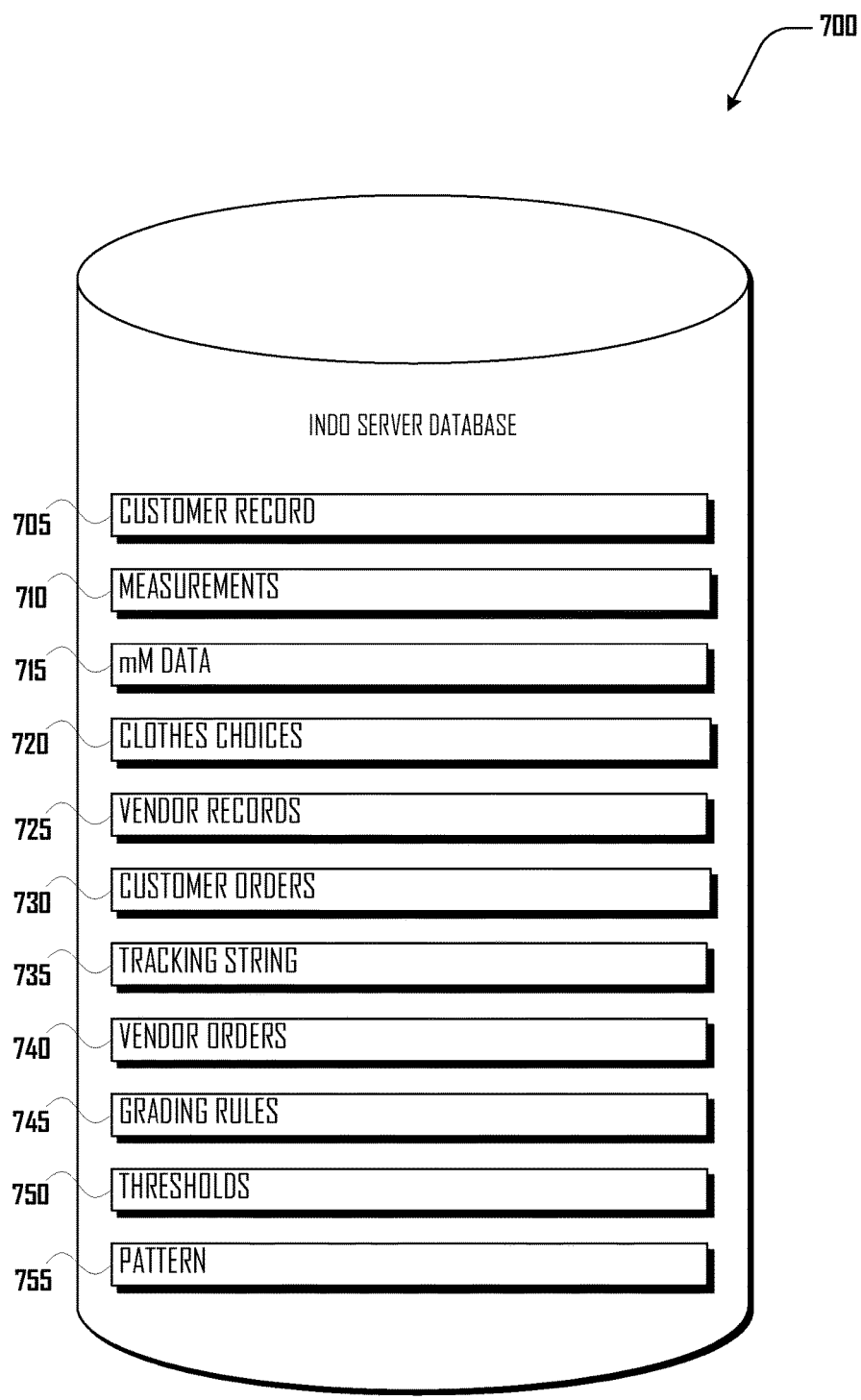
FIG. 7 is a functional block diagram of an Indo Server Database.

Computing device 600 also comprises or communicates via bus 620 with Indo Server Database 700, illustrated further in FIG. 7. In various embodiments, bus 620 may comprise a storage area network ("SAN"), a high speed serial bus, and/or via other suitable communication technology. In some embodiments, Indo Server 600 may communicate with Indo Server Database 700 via network interface 630.

FIG. 7 is a functional block diagram of Indo Server Database 700. Indo Server Database 700 comprises data groups used by routines, data groups such as the Customer Record 705, Measurements 710, mM Data 715, Clothes Choices 720, Vendor Records 725, Customer Orders 730, Tracking String 735, Vendor Orders 740, Grading Rules 745, Thresholds 750, Pattern 755, and the like. These data groups may be used by routines, such as Web Server Routine 660, Measure, Select, Order, and Fullfill Process 200, Measurement Process 300, Clothes Selector Process 400, Vendor Order Process 500, and the like.

The data groups used by routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

The software routines and data groups used by the software routines may be stored and/or executed remotely relative to any of the computers through, for example, application virtualization.

Figure 8:
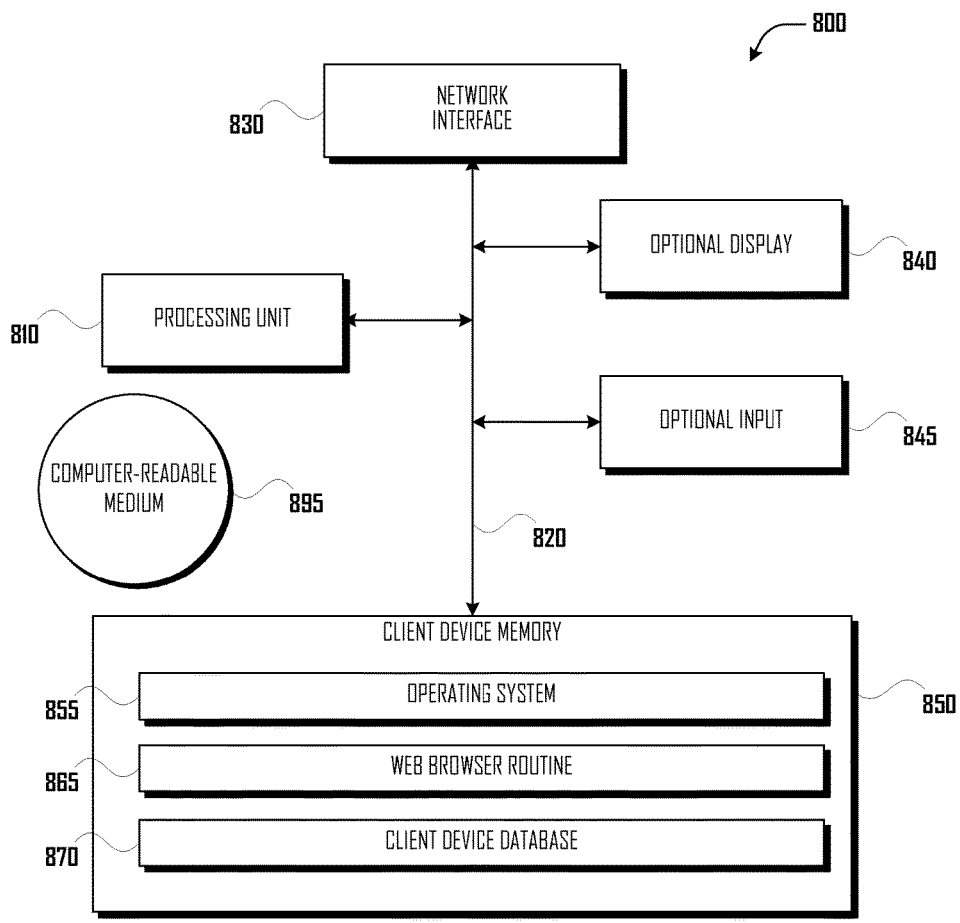
FIG. 8 is a functional block diagram of an exemplary Client Device and some data structures and/or components thereof.

FIG. 8 is a functional block diagram of an exemplary Client Device 800 computing device and some data structures and/or components thereof. In some embodiments, Client Device 800 may include many more components than those shown in FIG. 8. However, it is not necessary that all of these generally conventional components be shown in order to disclose an illustrative embodiment. As shown in FIG. 8, Client Device 800 includes network interface 830 for connecting to Network 150.

Client Device 800 also includes at least one processing unit 810, memory 850, and an optional display 840, all interconnected along with network interface 830 via bus 820. Memory 850 generally comprises a random access memory ("RAM"), a read only memory ("ROM"), and a permanent mass storage device, such as a disk drive or SDRAM (synchronous dynamic random-access memory). Memory 850 stores program code for software routines, such as, for example, Web Browser Routine 865 as well as email clients, servers, client applications, and database applications. In addition, memory 850 also stores an operating system 855. These software components may be loaded from a non-transient computer readable storage medium 895 into memory 850 of Client Device 800 using a drive mechanism (not shown) associated with a non-transient computer readable storage medium 895, such as a floppy disc, tape, DVD/CD-ROM drive, memory card, or other like storage medium. In some embodiments, software components may also or instead be loaded via a mechanism other than a drive mechanism and computer readable storage medium 895 (e.g., via network interface 830).

Client Device 800 may also comprise hardware supporting optional input modalities, Optional Input 845, such as, for example, a touchscreen, a keyboard, a mouse, a trackball, a stylus, a microphone, measurement sensors, and a video and/or still camera. Client Device 800 may include more than one computer; the Client Device 800 may include a computer measuring system, such as a Kinect® system by Microsoft, Inc. and/or a standard web cam in combination with software applications which can convert input from the measuring system into output which may be sent to Measurement Process 300 as Measurement(s) 710.

Client Device 800 also comprises or communicates via bus 820 with Client Device Database 870. In various embodiments, bus 820 may comprise a storage area network ("SAN"), a high speed serial bus, and/or via other suitable communication technology. In some embodiments, Client Device 800 may communicate with Client Device Database 870 via network interface 830.

The data groups used by routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

The software routines and data groups used by the software routines may be stored and/or executed remotely relative to any of the computers through, for example, application virtualization.

Web Browser Routine 865 and Web Server Routine 660 discussed in relation to Client Device 800 and Indo Server 600 may provide an interface for interaction between with Indo Server 600 and Client Device 800, which interaction may serve and receive data and information in the form of webpages and webcalls. The browsers and webservers are meant to illustrate user-interface and user-interface enabling routines generally, and may be replaced by equivalent routines for serving and rendering information to and in a user interface in Client Device 800 (whether in a web browser or in, for example, a mobile device application). Login credentials (such as a username and password) and local instances of user profiles (which may include name, address, email, phone, social media, and other contact information as well as billing information and client instances of Measurements 710) may be stored in or be accessible to Client Device 800, Indo Server 600, Vendor Device 130, and Third Party Server 140. Login credentials and user profiles may be part of Customer Record 705.

Figure 9:
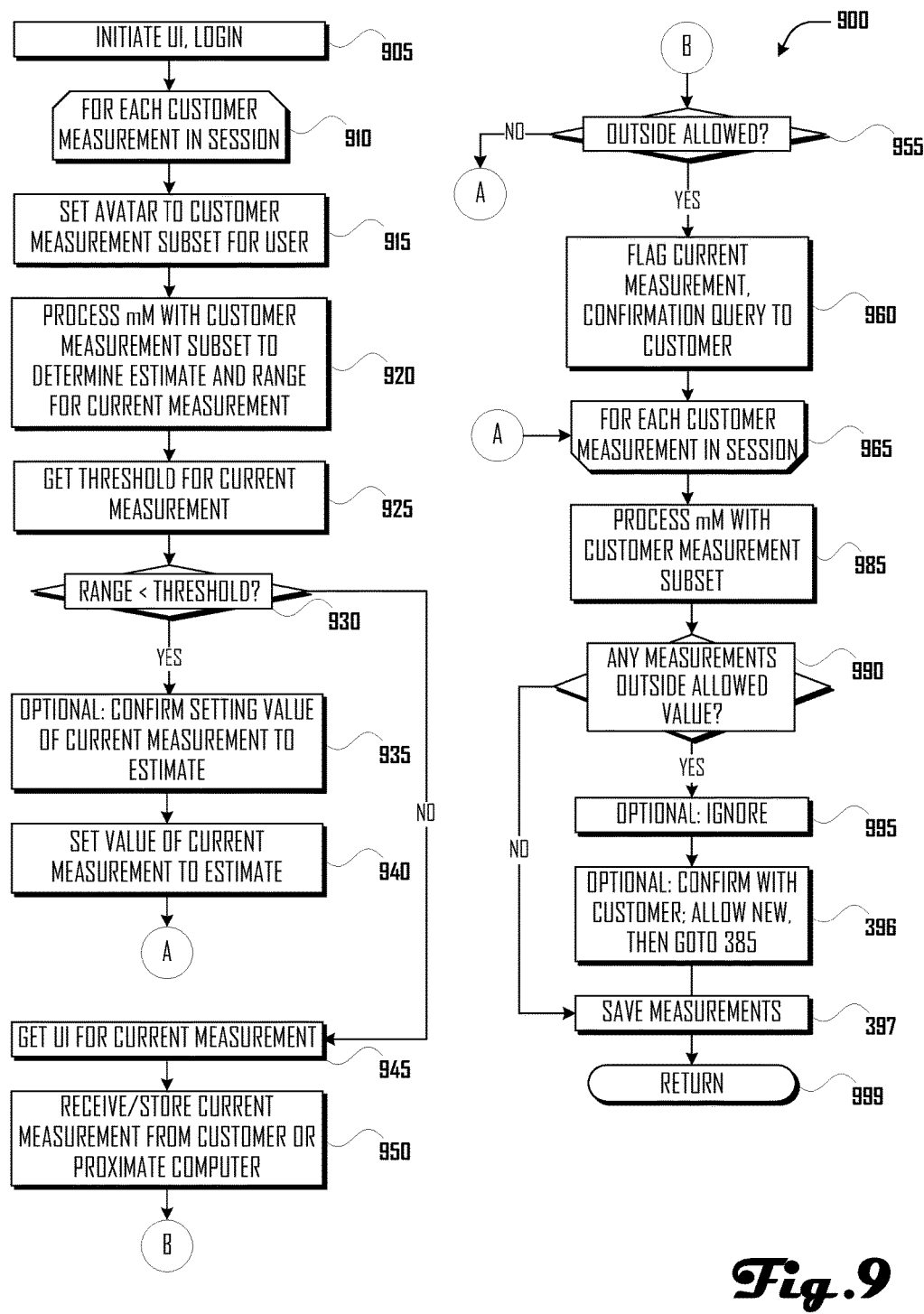
FIG. 9 illustrates another embodiment of a Measurement Process, in which Measurements are obtained from the Customer.

FIG. 9 illustrates an embodiment of Measurement Process 900, in which Measurements 710 are obtained for Customer from Client Device 800.

At block 905, a user interface ("UI") for obtaining Measurements 710 from Customer is initiated, such as by serving a webpage (or set of webpages) to Customer. The UI may comprise a login routine, which logs Customer into Measurement Process 900 and associates Customer with Customer Record 705.

The UI may contain components, such as an (optional) avatar which may be updated to approximate or illustrate Measurements 710 provided by Customer or which presents Measurement 710 choices to Customer as selectable options in the avatar, a set of questions which request that Customer provide Measurements 710, graphical figures (including illustrations, photographs, videos, and similar) and text which illustrate how to perform Measurements 710 or which illustrate Measurement 710 input to be provided by Customer (discussed further below in relation to block 945 and 950). The graphical figures may comprise input forms, boxes, and, for example, a "tape measure" to obtain Measurement(s) 710 and grading choices input by Customer. The "tape measure" may be a graphical representation of a tape measure or other graphical illustration of a measurement device divided into units, with the scale of the units presented in the illustration being selected according to the Measurement 710 in question (discussed further below in relation to block 945). The "tape measure" may be manipulated by Customer to input Measurements 710.

The UI may utilize camera(s) and sensor(s) (including those provided by a device such as a Kinect®) to obtain measurement data in relation to Customer, microphones to receive audio input from or acoustic information relating to the Customer, and a keyboard or the like to provide or obtain information to or from Customer to obtain Measurement(s) 710 and grading choices. The UI may perform speech recognition on audio input from Customer.

Blocks 910 to 965 may be iterated to obtain one or more Measurements 710 for Customer. Measurements 710 comprise Measurement 1 through N (where N is an integer; in the following example, N is 21), represented in the Figures as Current Measurement.

Measurements 710 may comprise, for example, the following group which may be performed through input of a numeric value measuring a dimension of a body, such as via the "tape measure": shirt neck size, jacket/shirt length, chest size, stomach size, hips, shoulder size, sleeve length, bicep size, wrist size, pants length, waist size, crotch size, thigh size, and knee size.

Measurements 710 may comprise, for example, the following group which may be performed through input of a numeric value: height, weight, and age.

Measurements 710 may comprise, for example, the following group which may be performed through selection of an example within a range relative to a physical attribute: shoulder type (Customer input may select from examples of, for example, square, normal, or sloping shoulder types), chest type (Customer input may select from examples of, for example, muscular, regular, or husky/hefty), stomach type (Customer input may select from examples of, for example, flat, average, or rounded), and posture (Customer input may select from examples of, for example, flat, straight, and relaxed postures)). Measurements 710 may further comprise the sex of the Customer.

At block 910, the then-current Measurement 710 is obtained, selecting a Measurement 710 which has not previously been obtained, estimated, or ignored (hereinafter the "Customer Measurement Subset") in a previous iteration of blocks 910 to 965, selecting a Measurement 710 which is not yet part of the Customer Measurement Subset.

At block 915, an avatar, "tape measure," or other graphical interface may be rendered to depict the Measurements 710 in the Customer Measurement Subset (the Measurements 710 which have been obtained, derived, or ignored). As discussed further below, because the Measurement Process 900 may utilize, for example, a Measurement Model "mM," and because, for example, the mM may utilize a distribution function, such as a probability distribution function, which probability distribution function may be an exponential family class of probability distribution functions, such as a normal probability density function and/or a joint probability density function, and because at the start of the iteration of blocks 910 through 965 the Customer has not yet provided Measurements 710, the first iteration of block 915 may set the graphical interface to depict the mean Measurement 710 value for each of the Measurements 710 across all Customers, as may be obtained, for example, from the mM Data 715. Alternatively, the "tape measure" or other graphical interface in the UI may be set to the mean Measurement 710 across all Customers for the first Measurement 710 which is to be obtained.

As blocks 910 through 965 iterate for each of the Measurements 710 1 through N, the mM may be processed with each successive Measurement 710, resulting in actual Measurements 710 which are then (at that iteration) depicted in the avatar or in the "tape measure" along with the mean for the remaining Measurements 710 (null value Measurements 710, which have not yet been provided), though now the mean of such remaining (null value) Measurements may be determined utilizing the mM relative to the actual Measurements 710 provided by the Customer.

As discussed herein, the mM may utilize, for example, a probability distribution function, which probability distribution function may be an exponential family class of probability distribution functions, such as a normal probability density function and/or a joint probability density function, which uses statistical analysis to characterize the probability of Measurements i across a large corpus of Measurements 710.

An example of an mM is as follows:

$$f(X_1, X_2, \ldots, X_n) = 1/(2\pi)^{n/2} |\Sigma|^{1/2}) * \exp(-\tfrac{1}{2}(X-\mu)^T \Sigma^{-1}(X-\mu))$$

Where each of $X_1, X_2, \ldots, X_n$ are the Measurements 710 for each of Measurements 1 through N, where $(X_1, X_2, \ldots, X_n)$ is the vector of all Measurement 710 values for each of Measurements 1 through N (where, in the example used herein, N is 21), and $\mu$ and $\Sigma$ are the model parameters mu and sigma. Values for the Measurements 710 may be transformed before being utilized in the mM function, such as by a logarithmic function (natural log or with another logarithmic base).

When supplied with null (or empty) values for any of Measurement(s) 710, the mM returns at least the mean of each of the Measurements 710; the mean of a Measurement 710 is also referred to herein as an "estimate" of the Measurement 710; when supplied with some actual values for Measurements 710 and null (or empty) values for the remaining Measurements 710, the mM returns the estimate of the remaining (null or empty) value Measurements 710, based on the actual values. Thus, for example, if the Customer provides a "height" Measurement value of 5'4", but has not yet supplied a value for a "pants length" Measurement 710, the mM will return an estimate for the "pants length" Measurement 710 based on other Customers who had a height of 5'4".

In addition to the values of Measurements 710, the mM may utilize the two model parameters, mu ($\mu$) and sigma ($\Sigma$). Generally speaking, mu is the mean, expectation, or estimated value for a particular Measurement 710 (which may be characterized as the peak of the distribution of values for the particular Measurement 710) while sigma is the standard deviation (generally, the square root of the variance; for example, four standard deviations—two on either side of the mean—may include 95.4% of all values in a normal probability density function).

The mM may also return the minimum and maximum expected values for the null values of the remaining Measurements 710, referred to herein as the "range," which range may include, for example, an acceptable number or users (as determined by the operator of the system and method), four standard deviations (two on either side of the mean), or 95% of all values for a particular Measurement 710, or another range of values. As discussed further herein, the range may be utilized to determine whether it is necessary to obtain an actual value of a Measurement 710 from the Customer. The estimate as well as the range may also (or alternatively) be utilized to set the centerline and range shown in the "tape measure" which the Customer may utilize to enter values for Measurements 710 in the UI.

Without limiting other statements in this paper which state that blocks may be omitted, blocks 920 through 940 may be omitted, proceeding from block 915 to block 945.

At block 920, the mM is processed with the values for the Customer Measurement Subset (Measurements supplied, estimated for, or ignored in relation to the Customer through the then-current stage of the iterative process of block 910 through 965) to determine the estimate and range for the remaining Measurements 710. Instead of processing all remaining Measurements 710, this block may only process the mM to determine the next Measurement 710 for which a Measurement 710 is then to be obtained from the Customer (the then-Current Measurement). As discussed above, processing the mM for the next (or all) remaining Measurements 710 will return at least the estimate and range for the next (or all) remaining Measurements 710, based on the Measurement 710 values which have actually been provided.

At block 925, the process may get Threshold 750 for the Measurement. Threshold 750 may be, for example, a confidence interval, an arbitrarily assigned value, a number of standard deviations, or another value.

At block 930, a determination may be made regarding whether the range from block 920 is less than Threshold 750 for the Current Measurement obtained at block 925. If the range is less than Threshold 750, then it may not be necessary to require that the Customer to go through a process to determine the Current Measurement (extra precision will not or will not significantly change the result). Thus, at block 935, the Customer may optionally be requested to confirm setting the value of the Current Measurement to the Estimate from block 920 and, at block 940, the value of the Current Measurement may be set to the Estimate from block 920. After block 940, the process goes to block 965, which may returns to block 910 if another Measurement 710 remains to be processed.

At block 945 the UI for the Current Measurement is obtained, served to the Customer, and rendered, which UI may include graphical figures (including illustrations, photographs, videos, and similar) and text which illustrate how to perform the Current Measurement or which illustrate how to interact with a computer measuring system to obtain the Current Measurement. The UI may also include Customer input fields or tools, such as illustrations of the Measurement options which may be selected by the Customer (as in, for example, the case of the "shoulders" Measurement) and the "tape measure" which the Customer may use to provide numeric input, such as by dragging a ruler (which may be rendered to appear as though to be a moving tape measure) beneath or in proximity to a pointer. As noted above, the estimate as well as the range may also (or alternatively) be utilized to set the centerline and range shown in the "tape measure" which the Customer may utilize to enter values for Measurements 710 in the UI.

At block 950, the Customer or a proximate computer, such as a computer measuring system, inputs the Current Measurement, which input is stored.

Without limiting other statements in this paper which state that blocks may be omitted, blocks 955 and 960 may be omitted, with the process proceeding from block 950 to 965.

At block 955, a determination may be made regarding whether the value input at block 950 was outside an allowed boundary. The determination may be made, for example, by running mM on the corpus of all Measurements 710 across all customers (the output thereof may found in the mM Data 715 and need not be performed anew for each successive Customer) as well as the Customer Measurement Subset and determining, for example, if the input value of block 950 is outside of four standard deviations (two on either side of the mean), or, for example, is the Measurement 710 of block 950 in the top or bottom 2.5% of all values, or, for example, does the Measurement 710 of block 950 have a value above or below a set amount.

If the input value is determined to have been outside the allowed boundary, then at block 960 Measurement 710 of block 950 may be flagged and/or a query may be presented to Customer in the UI requesting that Customer confirm the input value. If flagged and/or if Customer confirms the input value, the flagged input value may be accepted or, alternatively, ignored, with, for example, the value being left null or with the Estimate determined at block 920 being supplied for the Current Measurement.

At block 965, which may follow block 955 when the input value was not determined to be outside the allowed boundary or block 940 when the Current Measurement was set to the estimate of block 920, the process returns to block 910 to iterate for each of Customer Measurements 1 through N, until all the Measurements 1 through N have been obtained, ignored, or determined by the steps in blocks 910 through 965.

If not already performed, at block 985, the mM may be processed with the Customer Measurement Subset, which now includes all Customer Measurements 710 set at block 940, received at block 950, or confirmed or ignored at block 960.

At block 990, a determination may be made regarding whether any of Measurements 710 associated with Customer are outside of an allowed range of values. The determination may be made, for example, by determining if any of the Measurement 710 values are outside of four standard deviations (two on either side of the mean), or, for example, is the Measurement 710 in the top or bottom 2.5% of all values, or, for example, does a Measurement 710 have a value above or below a set amount. This block is similar to block 955, though now using a complete Customer Measurement Subset. At block 995, the outside-range value may be ignored, for example, by assigning a null value or by assigning the estimate determined at block 920, or, at block 996, the Customer may be asked to confirm the outside-range value or may be allowed to enter a new value, which may then send the process back to block 985.

At block 997, which may follow block 990 if it was determined that no Customer Measurements 710 were outside the allowed range, the Measurements 710 obtained, determined, or ignored in the Measurement Process 900 may be saved in association with, for example the Customer Record 705 associated with Customer.

At block 999, the process may return to FIG. 2 and block 400, an example embodiment of which is illustrated in FIG. 4.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method for generating garment measurements, the method comprising:
    providing a user interface accessible to users, by a server configured for generating the garment measurements, the user interface enabling body measurements for a person to be entered in association with a process for obtaining custom clothing for that person;
    receiving at the server, via the user interface, a set of body measurements 1 through N for the person;
    for each measurement i in the set of body measurements 1 through N:
        obtaining a value of that measurement i for the person from the set of body measurements received via the user interface;
        applying a distribution function to characterize a probability of that measurement i across a corpus of measurements of other people;
        determining that a measurement is outside an allowed range of values and is to be flagged; and
        when the value of that measurement i is determined to be outside of the allowed range of values:
            (a) flagging that measurement at the server using a display connected to the server; and
            (b) for the flagged measurement, prior to storing the flagged measurement, confirming the value to be stored for that person by performing one of: (i) receiving an input at the server by an operator of the server through one or more input modalities connected to the server, to accept the measurement i entered at the user interface, (ii) receiving an input at the server by the operator of the server using the one or more input modalities, to ignore the measurement i entered at the user interface, or (iii) send a query to the person using a network interface of the server, to confirm, by reply to the query, the associated input value; and
    storing the set of measurements in association with the person for subsequent generation of a garment pattern initiated by an instruction provided via the user interface or server.

2. The method according to claim 1, wherein receiving the value of measurement i for the person comprises receiving a single value of a single measurement in the set of measurements 1 through N.

3. The method according to claim 2, wherein receiving the value of measurement i for the person comprises receiving data input into the user interface via a client computing device, the data input originating from at least one of a camera, a computer measuring system, a keyboard, or a speech recognition process.

4. The method according to claim 1, wherein receiving the value of measurement i from the person comprises receiving multiple values for multiple measurements in the set of measurements 1 through N.

5. The method according to claim 1, further comprising scaling the determined set of measurements 1 through N for the person.

6. The method according to claim 1, further comprising:
    receiving a selection of a clothing choice from the person;
        identifying at least a first vendor associated with the selected clothing choice;
    determining a first pattern for the selected clothing choice based on the set of measurements 1 through N for the person; and
    transmitting to the first vendor the determined first pattern.

7. The method according to claim 6, further comprising associating the determined first pattern with a tracking string; receiving from the first vendor a set of clothes associated with the tracking string; and sending to the person the set of clothes associated with the tracking string.

8. The method according to claim 1, wherein determining the set of measurements 1 through N according to the distribution function comprises applying a logarithmic function to the received value of measurement i and utilizing the output thereof in the distribution function to determine the set of measurements 1 through N for the person according to the distribution function and the received measurement i.

9. The method according to claim 1, further comprising:
    determining an estimated value of a measurement i and a range of the measurement i in the set of measurements 1 through N according to the distribution function; and
    determining whether the range of the measurement i is larger than a threshold determined relative to the estimate of the measurement i.

10. The method according to claim 9, further comprising determining that the range of the measurement i is smaller than a threshold determined relative to the estimate of the measurement i and setting the value of the measurement i to be the estimated value, without requesting that the person provide the measurement i.

11. The method according to claim 9, further comprising, when the range of the measurement i is larger than a threshold determined relative to the estimate of the measurement i, and requesting that the person provide the measurement i via the user interface.

12. The method according to claim 9 wherein the user interface comprises a graphical representation of a measurement input device initially centered on a value and showing a scale of values on either side of the centered on value, wherein the value upon which the measurement input device is initially centered is the estimated value of the measurement i and the scale of values on either side of the centered on value is based on the range of the measurement i.

13. The method according to claim 12, wherein receiving a measurement i from the person comprises allowing the person to move the centered on value and then receiving such value as the value which is received from the person.

14. The method according to claim 1, wherein the set of measurements comprises a first subset comprising numeric values of height, weight, age, and numeric values from a measurement of a dimension of a body of the person and a second subset requiring selection of an example within a range relative to a physical attribute.

15. The method according to claim 14, wherein the measurement of a part of a body of the person in the first subset set of measurements comprises a measurement of at least one of shirt neck size, jacket/shirt length, chest size, stomach size, jacket hips, shoulder size, sleeve length, bicep size, wrist size, pants length, waist size, crotch size, thigh size, and knee size.

16. The method according to claim 14, wherein the second subset comprises at least one of shoulder type, chest type, stomach type, and posture.

17. The method according to claim 1, wherein the distribution function is a probability distribution function.

18. The method according to claim 17, wherein the probability distribution is multivariate.

19. The method according to claim 1, wherein the probability distribution is of the form:

$$f(X_1 X_2, \ldots, X_N) = 1/(2\pi)n/2 |\Sigma|^{1/2} * \exp(-\frac{1}{2}(X-\mu)^T \Sigma^{-1}(X-\mu))$$

where $(X_1 X_2, \ldots, X_N)$ is the vector of all measurement values for measurements 1 through N and $\mu$ and $\Sigma$ are model parameters.

20. The method according to claim 19, wherein $\mu$ is the peak of the distribution of values for a measurement i in the set of measurements 1 through N in the corpus of measurements.

21. The method according to claim 19, wherein $\Sigma$ is the standard deviation for a measurement i in the set of measurements 1 through N in the corpus of measurements.

22. The method of claim 1, further comprising generating clothing according to a pattern prepared using the set of measurements.

23. A computing apparatus for generating garment measurements, the apparatus comprising a processor and a memory storing instructions that, when executed by the processor, configure the apparatus to:
provide a user interface accessible to users, by a server configured for generating the garment measurements, the user interface enabling body measurements for a person to be entered in association with a process for obtaining custom clothing for that person;
receive at the server, via the user interface, a set of body measurements 1 through N for the person;
for each measurement i in the set of body measurements 1 through N:
obtain a value of that measurement i for the person from the set of body measurements received via the user interface;
apply a distribution function to characterize a probability of that measurement i across a corpus of measurements of other people;
determine that a measurement is outside an allowed range of values and is to be flagged; and
when the value of that measurement i is determined to be outside of the allowed range of values:
(a) flag that measurement at the server using a display connected to the server; and
(b) for the flagged measurement, prior to storing the flagged measurement, confirm the value to be stored for that person by performing one of: (i) receiving an input at the server by an operator of the server through one or more input modalities connected to the server, to accept the measurement i entered at the user interface, (ii) receiving an input at the server by the operator of the server using the one or more input modalities, to ignore the measurement i entered at the user interface, or (iii) send a query to the person using a network interface of the server, to confirm, by reply to the query, the associated input value; and
store the set of measurements in association with the person for subsequent generation of a garment pattern initiated by an instruction provided via the user interface or server.

24. A non-transient computer-readable storage medium having stored thereon instructions for generating garment measurements, including instructions that, when executed by a processor, configure the processor to:
provide a user interface accessible to users, by a server configured for generating the garment measurements, the user interface enabling body measurements for a person to be entered in association with a process for obtaining custom clothing for that person;
receive at the server, via the user interface, a set of body measurements 1 through N for the person;
for each measurement i in the set of body measurements 1 through N:
obtain a value of that measurement i for the person from the set of body measurements received via the user interface;
apply a distribution function to characterize a probability of that measurement i across a corpus of measurements of other people;
determine that a measurement is outside an allowed range of values and is to be flagged; and
when the value of that measurement i is determined to be outside of the allowed range of values:
(a) flag that measurement at the server using a display connected to the server; and
(b) for the flagged measurement, prior to storing the flagged measurement, confirm the value to be stored for that person by performing one of: (i) receiving an input at the server by an operator of the server through one or more input modalities connected to the server, to accept the measurement i entered at the user interface, (ii) receiving an input at the server by the operator of the server using the one or more input modalities, to ignore the measurement i entered at the user interface, or (iii) send a query to the person using a network interface of the server, to confirm, by reply to the query, the associated input value; and
store the set of measurements in association with the person for subsequent generation of a garment pattern initiated by an instruction provided via the user interface or server.

25. The method of claim 1, further comprising:
retrieving, for each of at least one measurement in the set of body measurements for the person, graphical elements which illustrate via the user interface how to perform the corresponding one of the at least one measurement;

providing to the user interface, for displaying to the person, the graphical elements for the at least one measurement, to illustrate via the user interface, how to perform each of the at least one measurement and thereby assist the server in obtaining the first set of body measurements.

26. The method of claim 25, wherein the graphical elements comprise one or more illustrations, one or more graphics, and/or one or more videos.

27. The method of claim 25, wherein the graphical elements further comprise text.

28. The method of claim 1, further comprising:
as the user interface iterates through obtaining the set of measurements, applying the distribution function with each successive measurement to determine at least one measurement not yet provided relative to actual measurements provided by the person; and
updating the user interface to reflect the at least one measurement not yet provided.

* * * * *